US012633689B2

(12) United States Patent
Yayoshi

(10) Patent No.: US 12,633,689 B2
(45) Date of Patent: May 19, 2026

(54) CONNECTOR

(71) Applicant: Japan Aviation Electronics Industry, Limited, Tokyo (JP)

(72) Inventor: Tadamichi Yayoshi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 431 days.

(21) Appl. No.: 18/100,710

(22) Filed: Jan. 24, 2023

(65) Prior Publication Data

US 2023/0246354 A1 Aug. 3, 2023

(30) Foreign Application Priority Data

Jan. 28, 2022 (JP) ................................ 2022-011661
May 30, 2022 (JP) ................................ 2022-087484

(51) Int. Cl.
*H01R 12/71* (2011.01)
*H01R 13/42* (2006.01)
*H01R 13/50* (2006.01)

(52) U.S. Cl.
CPC ........... *H01R 12/716* (2013.01); *H01R 13/42* (2013.01); *H01R 13/50* (2013.01)

(58) Field of Classification Search
CPC ....... H01R 12/716; H01R 13/42; H01R 13/50
See application file for complete search history.

(56) References Cited

U.S. PATENT DOCUMENTS 10,333,239 B2 6/2019 Ashibu et al.
11,581,677 B2 * 2/2023 Kobayashi ........... H01R 13/631
11,936,127 B2 * 3/2024 Tanaka ................. H01R 13/516
2020/0343660 A1 * 10/2020 Gondo ................... H01R 12/57
2023/0065611 A1 * 3/2023 Shioda .................. H01R 12/57

FOREIGN PATENT DOCUMENTS

JP 2014-078530 A 5/2014
JP 2018-142456 A 9/2018
JP 2019-140095 A 8/2019
JP 2022-070391 A 5/2022
WO WO-2023233950 A1 * 12/2023 ............... H01B 7/00

OTHER PUBLICATIONS

Office Action dated Dec. 24, 2025 in Japanese Patent Application No. 2022-087484, with machine English translation.

* cited by examiner

*Primary Examiner* — Renee S Luebke
*Assistant Examiner* — Paul D Baillargeon
(74) *Attorney, Agent, or Firm* — Collard & Roe, P.C.

(57) ABSTRACT

A connector is provided with terminals, a holding member and holddowns. The holding member has two side portions, two accommodation portions and an island portion. In a pitch direction (X-direction), the accommodation portions are located within a range not larger than the island portion. The terminals are divided into two terminal rows, which correspond to the accommodation portions, respectively. Each of the holddowns has an end wall portion and two side coupling portions. The end wall portions are located at end portions of the connector, respectively, in the pitch direction (X-direction). Each of the side coupling portions couples the end wall portion to either one of the side portions of the holding member. In the up-down direction (X-direction), the holding member does not overlap with the end wall portion.

2 Claims, 11 Drawing Sheets

CONNECTOR

CROSS REFERENCE TO RELATED APPLICATIONS

This application is based on and claims priority under 35 U.S.C. § 119 to Japanese Patent Applications No. JP2022-011661 filed Jan. 28, 2022 and JP2022-087484 filed May 30, 2022, the contents of which are incorporated herein in their entirety by reference.

BACKGROUND OF THE INVENTION

This invention relates to a connector, particularly, to a connector provided with a plurality of terminals arranged in a predetermined direction.

JP 2018-142456 A (Patent Document 1) discloses a connector provided with a plurality of terminals arranged in two rows. As shown in FIG. 18, a connector 90 of Patent Document 1 is provided with a plurality of terminals 92, a housing (a holding member) 94 which holds the terminals 92 and two additional members (holddowns) 96 provided at both ends of the housing 94.

As understood from FIG. 18, the housing 94 has a surrounding wall 941 and a protruding wall 943. When viewed along an up-down direction (a Z-direction), the surrounding wall 941 has a frame shape long in a pitch direction (an X-direction). In detail, the surrounding wall 941 has a pair of side walls 951 extending in the pitch direction and a pair of coupling walls 953 extending in a width direction (a Y-direction). The protruding wall 943 has a generally rectangular parallelepiped shape long in the pitch direction. The protruding wall 943 is located inward of the surrounding wall 941 in each of the pitch direction and the width direction. The protruding wall 943 is coupled to the surrounding wall 941 by a plurality of bottom wall portions (not shown).

As shown in FIG. 18, each of the additional members 96 has a pair of side portions 961 and a coupling portion 963 which couples the side portions 961 with each other. Each of the side portions 961 covers the side wall 951 of the housing 94, which corresponds thereto, in part. The coupling portion 963 covers the coupling wall 953 of the housing 94, which corresponds thereto, in part.

In the connector 90 of Patent Document 1, the housing 94 is molded by using resin. In detail, the housing 94 is manufactured by pouring melted resin into a cavity of a die (not shown). Generally, the pouring of the melted resin is performed from an end of the cavity in a longitudinal direction. In a case of the connector 90 of Patent Document 1, one of the coupling walls 953 of the housing 94 is a part corresponding to the end of the cavity in the longitudinal direction. Accordingly, the melted resin is poured into the cavity so that the melted resin flows through a part of the cavity, which corresponds to one of the coupling walls 953 of the housing 94, toward another part of the cavity, which corresponds to the other of the coupling walls 953 of the housing 94.

SUMMARY OF THE INVENTION

As understood from FIG. 18, an area of a cross-section of the housing 94 that is taken on a plane perpendicular to the pitch direction varies significantly depending on its cutting position. In particular, an area of a cross-section whose cutting position is located at the coupling wall 953 is significantly different from another area of a cross-section whose cutting position is located between the coupling wall 953 and the protruding wall 943. This means that there can be a bottleneck when the housing 94 is molded. Such structure of the cavity tends to cause a short shot that the melted resin is inadequately poured into the cavity. In particular, the tendency is remarkable when a size of the housing 94 in the pitch direction is larger. Accordingly, the connector 90 of Patent Document 1 has a problem that it is difficult to increase the size of the housing 94 in the pitch direction. This also means that it is difficult to increase the number of the terminals 92 of the connector 90. Therefore, there is a demand for a connector provided with a holding member which has structure in which fluidity of melted resin is considered so that it can increase a size of a housing in a pitch direction.

It is an object of the present invention to provide a connector which is provided with a holding member with structure in which fluidity of melted resin is considered.

One aspect of the present invention provides a connector which comprises a plurality of terminals, a holding member which holds the terminals and two holddowns which are located at both ends of the holding member in a pitch direction. The holding member comprises two side portions, two accommodation portions and an island portion. The island portion is located between the side portions in a width direction perpendicular to the pitch direction. The accommodation portions correspond to the side portions, respectively. Each of the accommodation portions is located between the side portion corresponding thereto and the island portion in the width direction. Each of the accommodation portions is an area which accommodates a part of the mating connector when the connector and the mating connector are mated with each other. The accommodation portions are located within a range not larger than the island portion in the pitch direction. Each of the terminals has a contact point. The terminals are divided into two terminal rows. The terminal rows correspond to the accommodation portions, respectively. The contact points of the terminals belonging to each of the terminal rows are located at least in part in the accommodation portion corresponding to the terminal row. Each of the holddowns has an end wall portion and two side coupling portions. The end wall portion is located at either one of end portions of the connector in the pitch direction. The side coupling portions couple the end wall portion to the side portions, respectively. The holding member does not overlap with the end wall portions of the holddowns in an up-down direction perpendicular to both the pitch direction and the width direction.

Another aspect of the present invention provides a connector which comprises a plurality of terminals, a holding member which holds the terminals and two holddowns which are located at both ends of the holding member in a pitch direction. The holding member comprises two side portions, two accommodation portions and an island portion. The island portion is located between the side portions in a width direction perpendicular to the pitch direction. The accommodation portions correspond to the side portions, respectively. Each of the accommodation portions is located between the side portion corresponding thereto and the island portion in the width direction. Each of the accommodation portions is an area which accommodates a part of the mating connector when the connector and a mating connector are mated with each other. Each of the terminals has a contact point. The terminals are divided into two terminal rows. The terminal rows correspond to the accommodation portions, respectively. The contact points of the terminals belonging to each of the terminal rows are located at least in part in the accommodation portion corresponding to the terminal row. The island portion is provided with a gate mark on a bottom portion thereof at a vicinity of one of the end portions thereof in the pitch direction.

In the connector according to the aspect of the present invention, the two holddowns are located at the both ends of the holding member in the pitch direction. In addition, the end wall portions of the holddowns do not overlap with the holding member in the up-down direction. In other words, the holding member does not reach the both ends of the connector in the pitch direction. Thus, structure of the end portions of the holding member in the pitch direction can be simplified, and fluidity of melted resin can be improved when the holding member is molded. In this way, the present invention can provide a connector which is provided with a holding member with structure in which fluidity of melted resin is considered. Moreover, the present invention can provide a connector with structure in which terminals can be easily increased in number.

An appreciation of the objectives of the present invention and a more complete understanding of its structure may be had by studying the following description of the preferred embodiment and by referring to the accompanying drawings.

Figure 1:
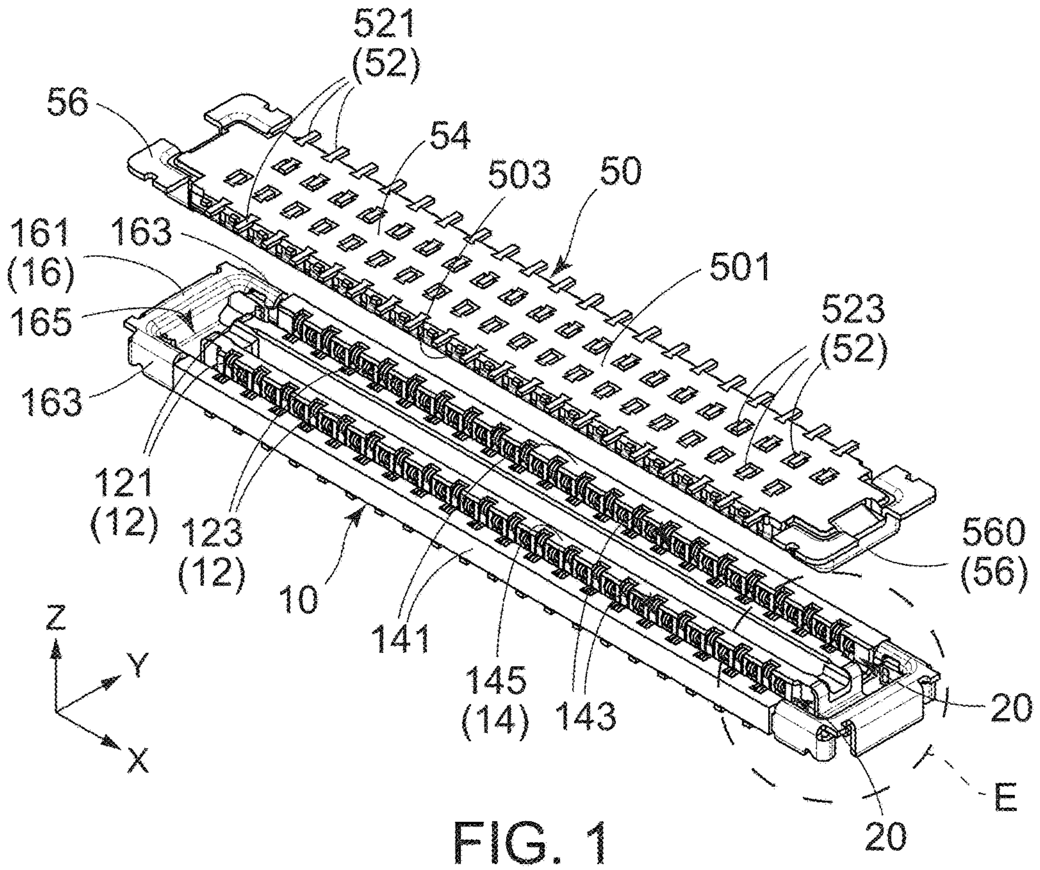
FIG. 1 is a perspective view showing a connector assembly having a connector according to an embodiment of the present invention and a mating connector connectable with the connector. The connector and the mating connector are separated from each other.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIGS. 1, 1A, 2, and 3, a connector 10 according to an embodiment of the present invention is a connector which is mateable with and separatable from a mating connector 50 in an up-down direction. Each of the connector 10 and the mating connector 50 is a board mounting type connector which is mounted on a substrate (not shown). For example, the connector 10 is mounted on an upper surface of a first substrate (not shown) while the mating connector 50 is mounted on a lower surface of a second substrate (not shown). In the present embodiment, the up-down direction is a Z-direction. A positive Z-direction is directed upward while a negative Z-direction is directed downward.

Figure 1A:
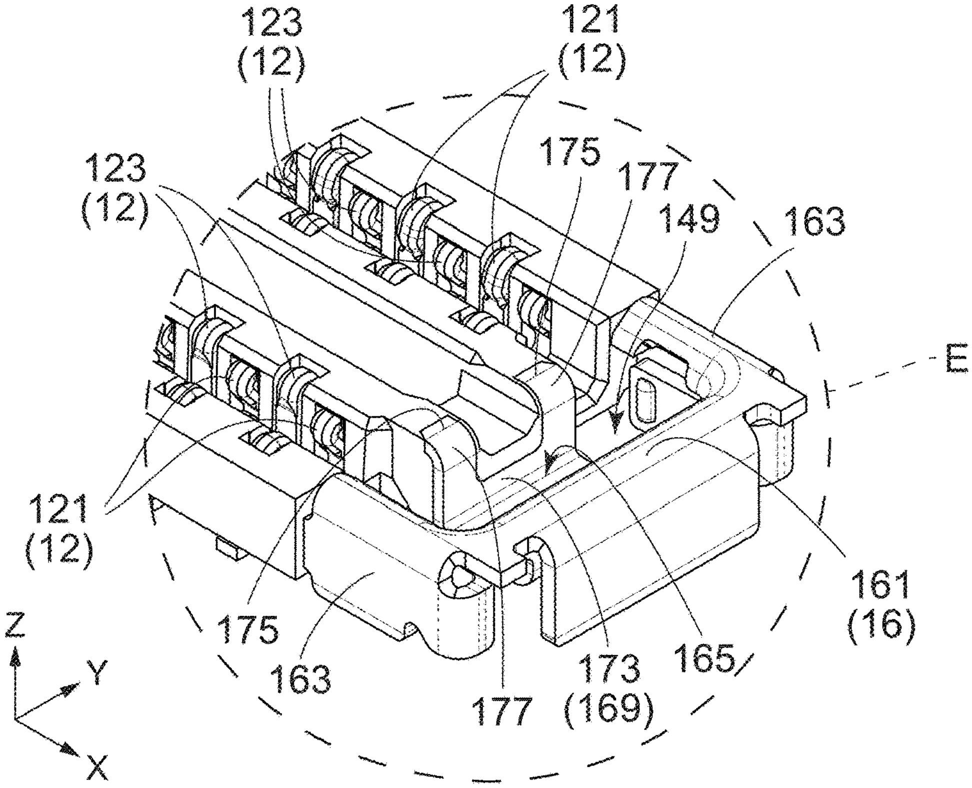
FIG. 1A shows, in an enlarged fashion, a part of the connector depicted of FIG. 1 enclosed by a dashed line E.
Figure 2:
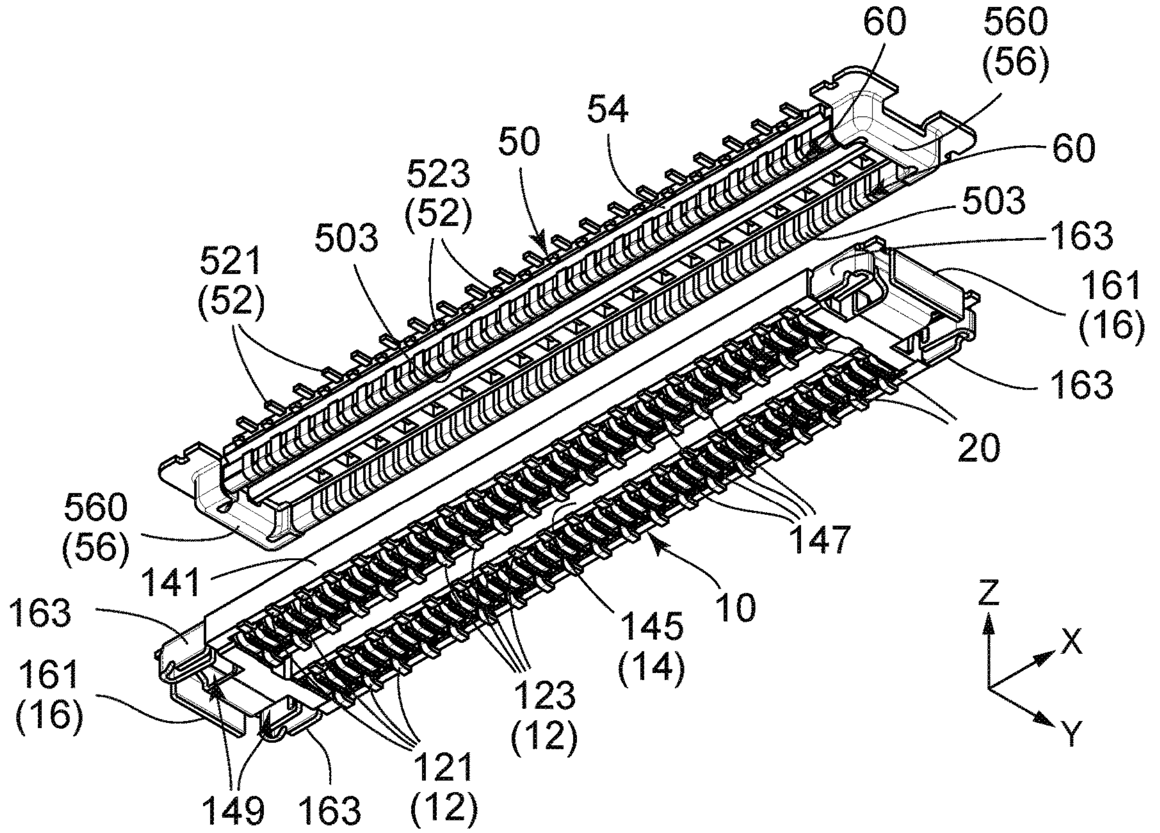
FIG. 2 is another perspective view showing the connector assembly of FIG. 1.
Figure 3:
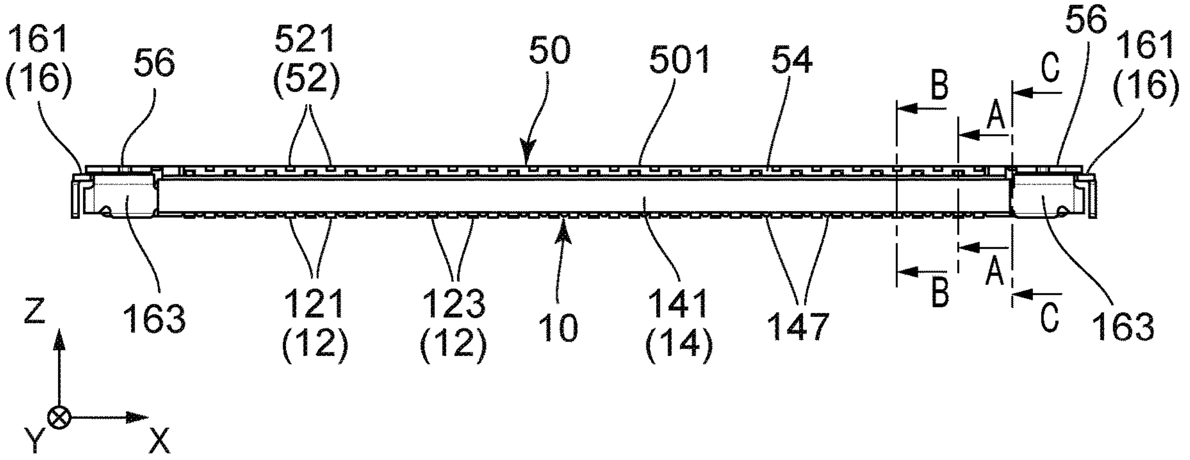
FIG. 3 is a front view showing the connector assembly of FIG. 1. The connector and the mating connector are mated with each other.

As shown in FIGS. 1, 1A, and 2, the mating connector 50 is a plug connector which is long in a pitch direction and has a low profile. The mating connector 50 is provided with a plurality of mating terminals 52, a mating holding member 54 which holds the mating terminals 52 and two mating holddowns 56. Each of the mating terminals 52 and the mating holddowns 56 is made of metal, and the mating holding member 54 is made of insulating resin. The mating holddowns 56 are located at both ends of the mating holding member 54 in a pitch direction. In the present embodiment, the pitch direction is a direction perpendicular to the up-down direction, an X-direction.

As shown in FIGS. 1, 1A, and 2, the mating terminals 52 are divided into two mating terminal rows 60. The two mating terminal rows 60 are arranged in a width direction perpendicular to both the pitch direction and the up-down direction. In the present embodiment, the width direction is a Y-direction. In each of the mating terminal rows 60, the mating terminals 52 are arranged in the pitch direction at predetermined intervals. In the present embodiment, the mating terminals 52 are held by the mating holding member 54 by insert molding. However, the present invention is not limited thereto. The mating terminals 52 may be held by the mating holding member 54 by means of any method other than the insert molding, for example, press-fitting.

Figure 4:
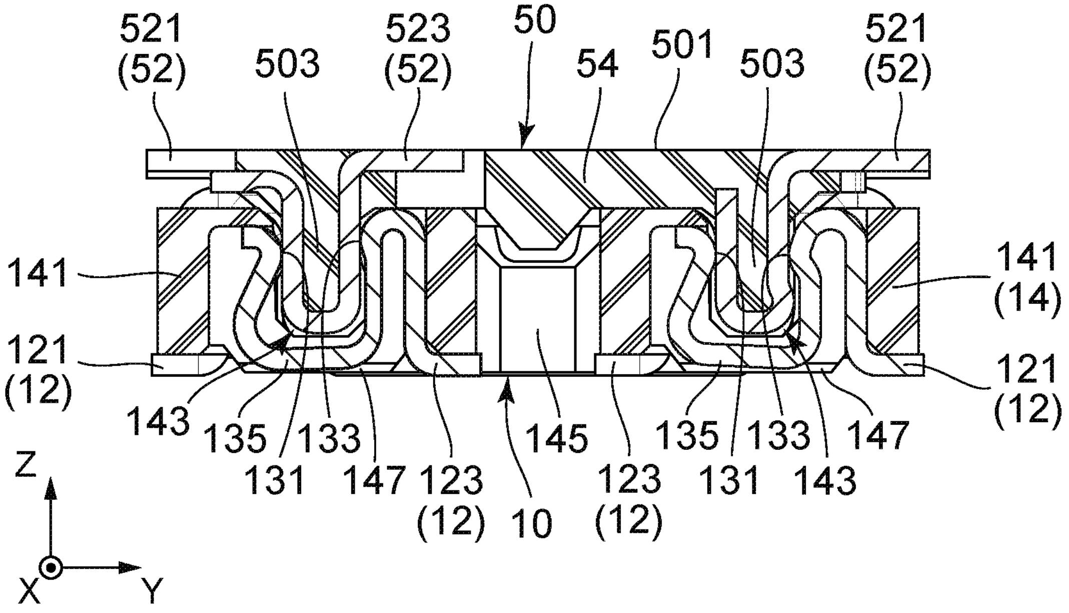
FIG. 4 is a cross-sectional view showing the connector assembly of FIG. 3, taken along A-A line.
Figure 5:
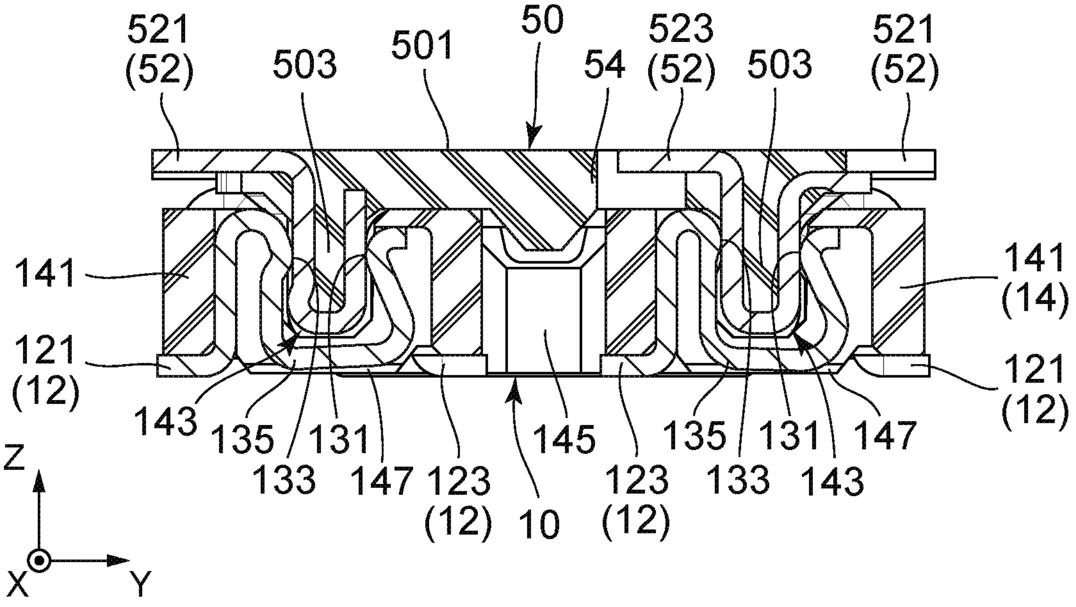
FIG. 5 is a cross-sectional view showing the connector assembly of FIG. 3, taken along B-B line.
Figure 6:
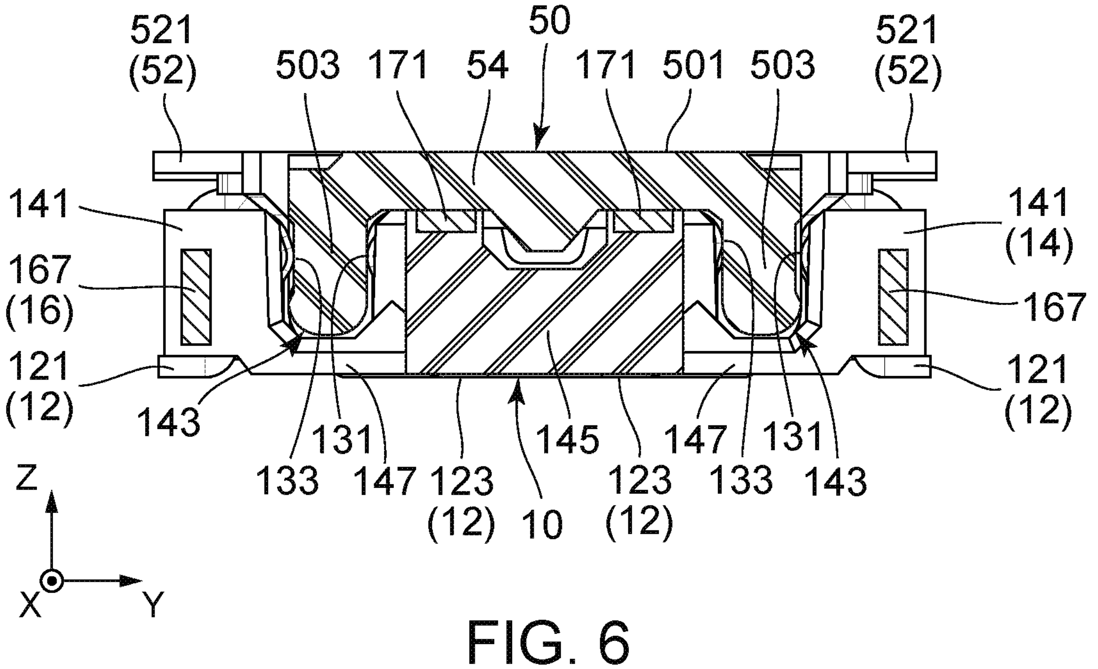
FIG. 6 is a cross-sectional view showing the connector assembly of FIG. 3, taken along C-C line.

As understood from FIGS. 4 and 5, the mating terminals 52 include first mating terminals 521 and second mating terminals 523. The first mating terminals 521 and the second mating terminals 523 are alternately arranged in the pitch direction. The two mating terminal rows 60 are rotational symmetry about an axis along the up-down direction. In the pitch direction, the first mating terminal 521 and the second mating terminal 523 are arranged.

As understood from FIGS. 4 and 5, in the present embodiment, the first mating terminal 521 and the second mating terminal 523 are same as each other in basic structure, but they are slightly different from each other in shape. However, the present invention is not limited thereto. The first mating terminal 521 and the second mating terminal 523 may be same as or different from each other in shape. Additionally, the detailed description about the shapes of the first mating terminal 521 and the second mating terminal 523 is omitted.

As understood from FIGS. 1, 1A, and 2, the mating connector 50 has a top portion 501 and two accommodated portions 503. The top portion 501 is a part of the mating holding member 54. Each of the accommodated portions 503 is formed by a part of the mating holding member 54 and parts of the mating terminals 52. The accommodated portions 503 correspond to the mating terminal rows 60, respectively, and extend in the pitch direction. The two accommodated portions 503 are coupled to each other by the top portion 501 and protrude downward from the top portion 501. Each of the mating holddowns 56 couples either one couple of end portions of the accommodated portions 503 to each other. Each of the mating holddowns 56 has an end accommodated portion 560 extending in the width direction.

As shown in FIGS. 1, 1A, and 2, the connector 10 is a receptacle connector which is long in the pitch direction and has a low profile. The connector 10 is provided with a plurality of terminals 12, a holding member 14 which holds the terminals 12 and two holddowns 16. Each of the terminals 12 and the holddowns 16 is made of metal while the holding member 14 is made of insulating resin. The holddowns 16 are located at both ends of the holding member 14 in the pitch direction.

As shown in FIGS. 1, 1A, 2, 7, and 7A, the terminals 12 are divided into two terminal rows 20. The two terminal rows 20 are arranged in the width direction. In each of the terminal rows 20, the terminals 12 are arranged in the pitch direction at predetermined intervals. In the present embodiment, the terminals 12 are held by the holding member 14 by press fitting. However, the present invention is not limited thereto. The terminals 12 may be held by the holding member 14 by means of any method other than press fitting, for example, insert molding.

Referring to FIGS. 9 to 12, the holding member 14 has two side portions 141, two accommodation portions 143, an island portion 145 and a plurality of coupling portions 147. Each of the side portions 141, the accommodation portions 143 and the island portion 145 extends in the pitch direction. The island portion 145 is located between the side portions 141 in the width direction. In the present embodiment, the island portion 145 has a generally frame shape when viewed along the up-down direction. The accommodation portions 143 correspond to the side portions 141, respectively. In detail, each of the accommodation portions 143 is located between the side portion 141 corresponding thereto and the island portion 145 in the width direction. In the present embodiment, each of the accommodation portions 143 has a channel-like shape extending in the pitch direction. In the pitch direction, a size of the accommodation portion 143 is equal to that of the side portion 141. In other words, the accommodation portions 143 pierce the holding member 14 in the pitch direction. In the pitch direction, the size of the side portion 141 is smaller than that of the island portion 145. Accordingly, the accommodation portions 143 are located within a range not larger than the island portion 145 in the pitch direction.

As understood from FIGS. 1, 1A. 2, 7, and 7A, the terminal rows 20 correspond to the side portions 141 of the holding member 14, respectively, and to the accommodation portions 143, respectively. The terminal rows 20 also correspond to the mating terminal rows 60, respectively, and the terminals 12 correspond to the mating terminals 52, respectively.

As understood from FIGS. 4 and 5, the terminals 12 include first terminals 121 and second terminals 123. The first terminals 121 and the second terminals 123 are alternately arranged in the pitch direction. The first terminals 121 correspond to the first mating terminals 521, respectively, and the second terminals 123 correspond to the second mating terminals 523, respectively. The two terminal rows 20 are rotational symmetry about an axis along the up-down direction. In the pitch direction, the first terminal 121 and the second terminal 123 are arranged.

As understood from FIGS. 4 and 5, in the present embodiment, the first terminal 121 and the second terminal 123 are same as each other in basic structure, but they are slightly different from each other in shape. However, the present invention is not limited thereto. The first terminal 121 and the second terminal 123 may be same as or different from each other in shape. The detailed description about the shapes of the first terminal 121 and the second terminal 123 is omitted.

As shown in FIGS. 4 and 5, each of the terminals 12 has a contact point 131. In the present embodiment, each of the terminals 12 further has an additional contact point 133. The contact point 131 and the additional contact point 133 are supported by a supporting portion 135, and they are apart from and face each other in the width direction. Each of the first terminals 121 is partly embedded in the side portion 141 corresponding thereto and held by the holding member 14. Each of the second terminals 123 is partly embedded in the island portion 145 and held by the holding member 14. The supporting portion 135 of each of the terminals 12 is not embedded in the holding member 14 but resiliently deformable. Thus, each of the terminals 12 is a spring contact. Due to resilient deformation of the supporting portion 135, a distance between the contact point 131 and the additional contact point 133 is variable in the width direction.

Figure 7:
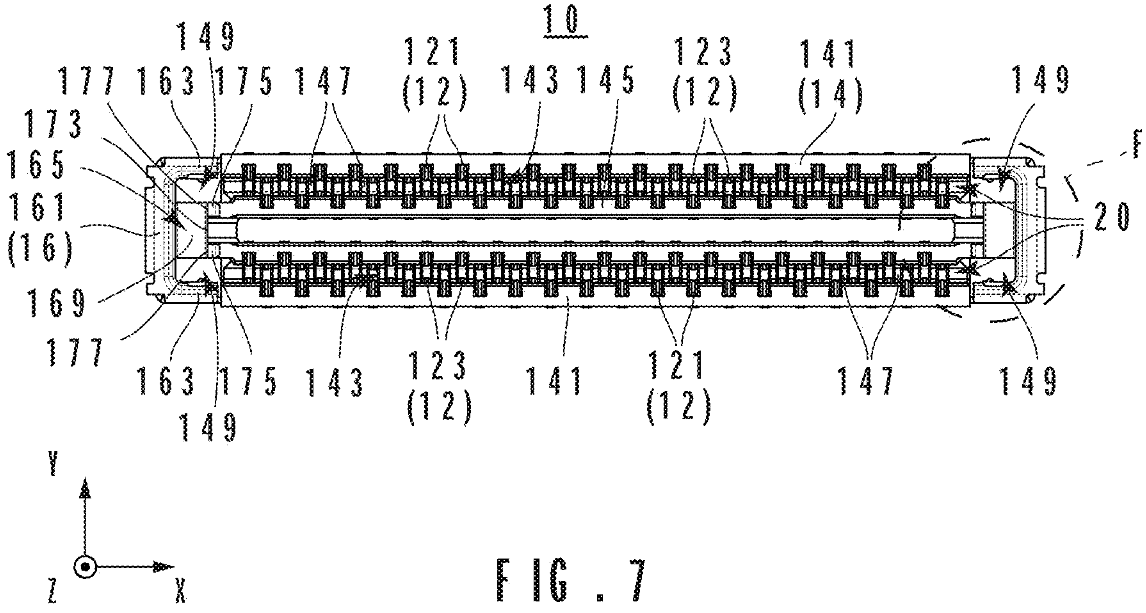
FIG. 7 is a plan view showing the connector according to the embodiment of the present invention.
Figure 7A:
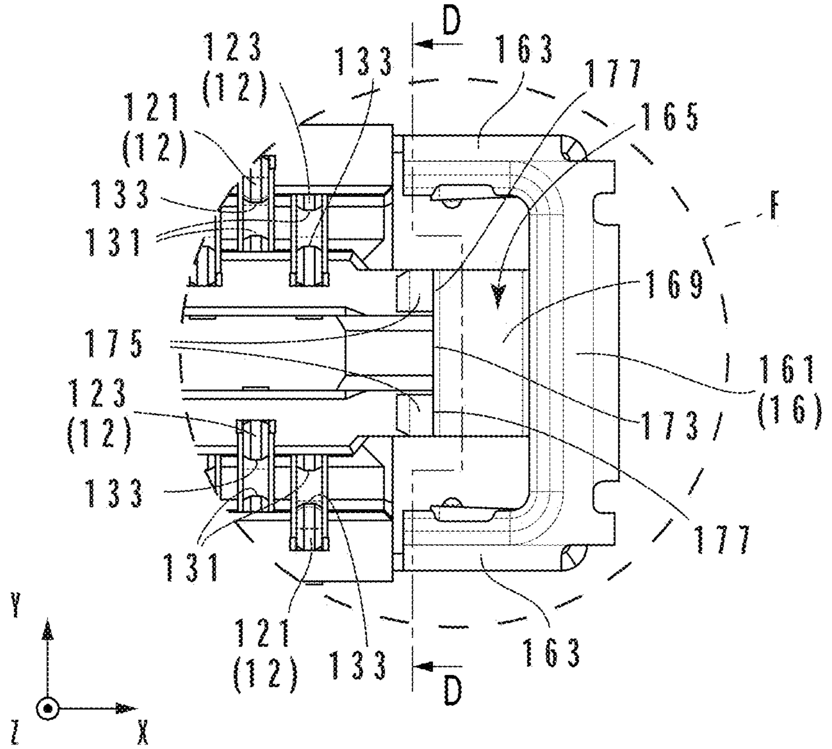
FIG. 7A shows, in an enlarged fashion, a part of the connector of FIG. 7 enclosed by a dashed line F.
Figure 8:
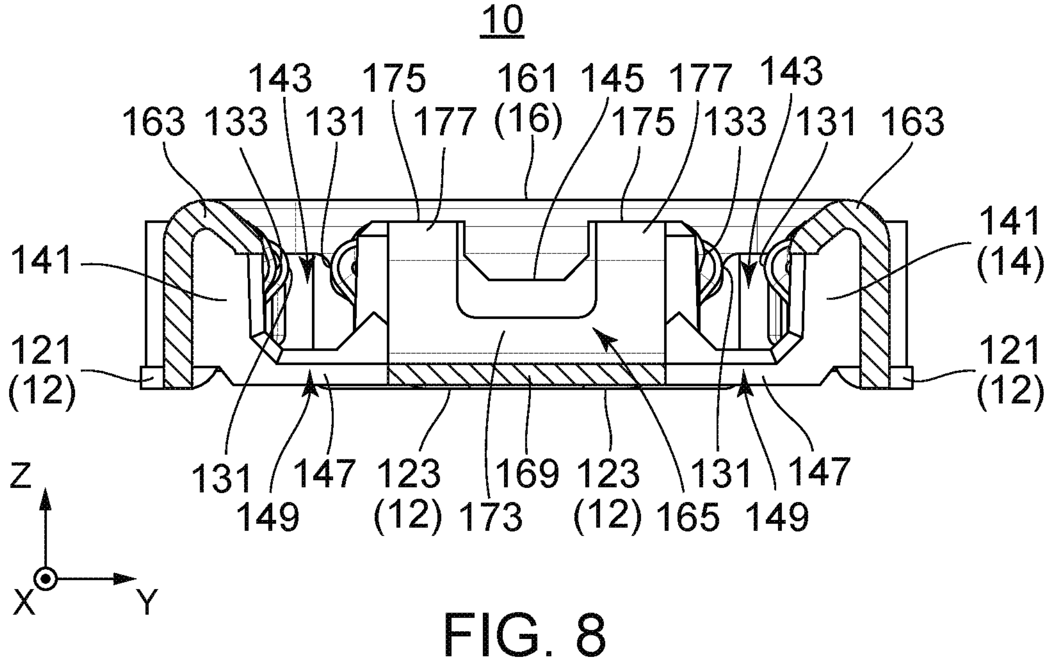
FIG. 8 is a cross-sectional view showing the connector of FIG. 7, taken along D-D line.

As understood from FIGS. 4 and 5, each of the accommodation portions 143 of the holding member 14 is an area which accommodates a part of the mating connector 50 when the connector 10 and the mating connector 50 are mated with each other. In detail, the accommodation portions 143 are areas which accommodate the accommodated portions 503 of the mating connector 50, respectively. As shown in FIGS. 7, 7A, and 8, the contact point 131 and the additional contact point 133 of the terminal 12 are located at least in part in the accommodation portion 143 corresponding to the terminal 12. When the connector 10 and the mating connector 50 are mated with each other, the contact point 131 and the additional contact point 133 are brought into contact with the mating terminal 52 corresponding to them.

As shown in FIGS. 13 to 16, each of the holddowns 16 has an end wall portion 161 and two side coupling portions 163. The end wall portion 161 has a generally inverted U-shape when viewed along the width direction and extends in the width direction. The side coupling portions 163 are provided on both ends of the end wall portion 161 in the width direction. Each of the side coupling portions 163 has a generally inverted J-shape when viewed along the pitch direction and extends in the pitch direction. In the present embodiment, each of the holddowns 16 further has a side embedded portion 167 extending from each of the side coupling portions 163 in the pitch direction. In the present embodiment, the side embedded portion 167 has a generally V-shape when viewed along the width direction. However, the present invention is not limited thereto. The shape of the side embedded portion 167 is not particularly limited.

As shown in FIGS. 13 to 16, each of the holddowns 16 of the present embodiment further has a middle coupling portion 169. The middle coupling portion 169 extends inward in the pitch direction from an inner lower end of the end wall portion 161 in the pitch direction, and then extends upward, and further extends inward in the pitch direction. The middle coupling portion 169 is apart from the side coupling portions 163 in the width direction. In the present embodiment, the middle coupling portion 169 is forked at a tip side thereof. However, the present invention is not limited thereto. The holddown 16 may not have the middle coupling portion 169. Moreover, the middle coupling portion 169 may not be forked.

As shown in FIGS. 13 to 16, the holddown 16 further has two middle embedded portions 171 extending from the middle coupling portion 169. However, the present invention is not limited thereto. The holddown 16 may not have the middle embedded portions 171. Moreover, the number of the middle embedded portion(s) 171 may be equal to one depending on the shape of the middle coupling portion 169.

As shown in FIGS. 7 and 7A, the end wall portion 161 of each of the holddowns 16 is located at either one of end portions of the connector 10 in the pitch direction. Each of the side coupling portions 163 couples the end wall portion 161 to either one of the side portions 141 of the holding member 14. As understood from FIGS. 6, 7, 7A, and 13, the side embedded portions 167 are embedded in the side portions 141 of the holding member 14, respectively. In the present embodiment, the holddown 16 is attached to the holding member 14 by insert molding. However, the present invention is not limited thereto. The holddown 16 may be attached to the holding member 14 by means of any method other than the insert molding, for example, press fitting.

As understood from FIGS. 7 and 7A, the end wall portion 161 of the holddown 16 is apart from the holding member 14 in the pitch direction. In other words, in the up-down direction, the holding member 14 does not overlap with the end wall portion 161. As understood from FIGS. 7, 7A, and 8, in the pitch direction, a space is provided between the accommodation portions 143 and the end wall portion 161 of each of the holddowns 16. Moreover, between the holding member 14 and the end wall portion 161 in the pitch direction, an end accommodation portion 165 is formed.

As understood from FIGS. 1 and 1A, the middle coupling portion 169 of the holddown 16 is embedded in the island portion 145 of the holding member 14 in part. The middle coupling portion 169 couples the end wall portion 161 to the island portion 145 of the holding member 14. In addition, as understood from FIGS. 1 and 6, the middle embedded portions 171 of the holddown 16 extend toward the island portion 145 of the holding member 14 from the middle coupling portion 169 and are embedded in the island portion 145.

As shown in FIGS. 1 and 1A, the middle coupling portion 169 has a side surface 173 directed outward in the pitch direction and upper surfaces 175, and the side surface 173 and the upper surfaces 175 are exposed outside the holding member 14. A border portion between the side surface 173 and each of the upper surfaces 175 of the middle coupling portion 169 functions as a protection portion 177 which protects the island portion 145 of the holding member 14 in part. In detail, the protection portion 177 covers and protects, at least in part, an upper corner portion of an end portion in the pitch direction of the island portion 145 of the holding member 14. When the connector 10 is mated with the mating connector 50, the protection portion 177 prevents the mating connector 50 from being brought into contact with the island portion 145 and from scraping or breaking the island portion 145. Thus, in the present embodiment, the holddown 16 has the protection portions 177 which cover and protect, at least in part, the upper corner portion of the end portion in the pitch direction of the island portion 145 of the holding member 14.

As understood from FIGS. 7 and 7A, in the present embodiment, both ends of each of the accommodation portions of the holding member 14 are located inward of the island portion 145 in the pitch direction. In addition, the middle coupling portion 169 of the holddown 16 is apart from the side coupling portions 163 in the width direction. Accordingly, the connector 10 of the present embodiment has penetration areas 149 which are located outward of the holding member 14 in a plane perpendicular to the up-down direction and which penetrate the connector 10 in the up-down direction. In the present embodiment, the penetration areas 149 are four in number. Each of the penetration areas 149 is located between the middle coupling portion 169 and either one of the side coupling portions 163. However, the present invention is not limited thereto. The connector 10 should have at least one penetration area 149. For example, when the holddown 16 does not have the middle coupling portion 169, the number of the penetration areas 149 is equal to two. At any rate, in the present embodiment, when viewed from inside of the accommodation portion 143 toward outside in the pitch direction, a part of the holddown 16 or the end wall portion 161 is visible without obstruction of the holding member 14.

Figure 9:
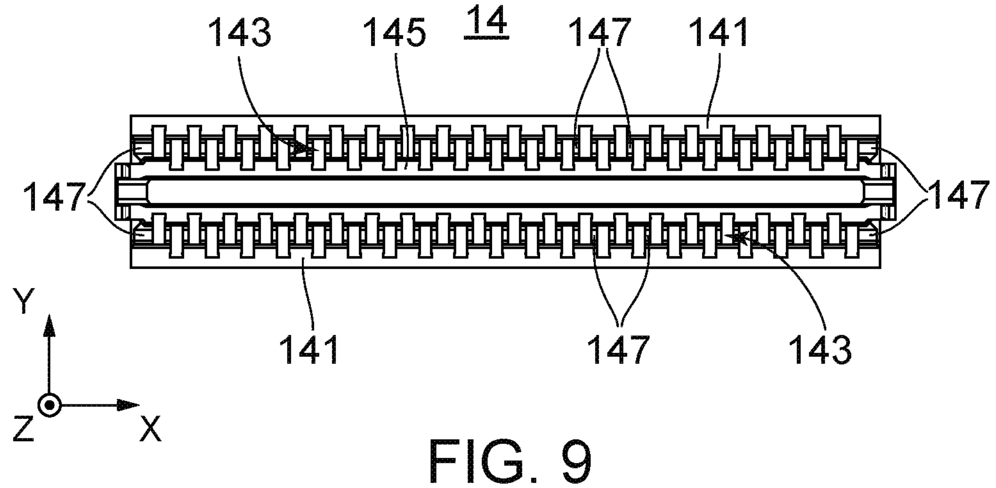
FIG. 9 is a plan view showing a holding member included in the connector of FIG. 7.
Figure 10:
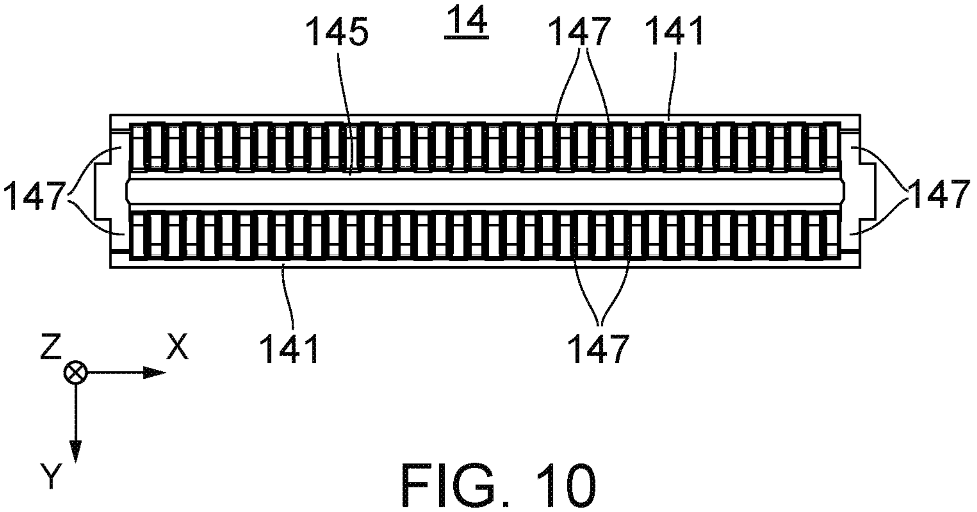
FIG. 10 is a bottom view showing the holding member of FIG. 9.
Figure 11:
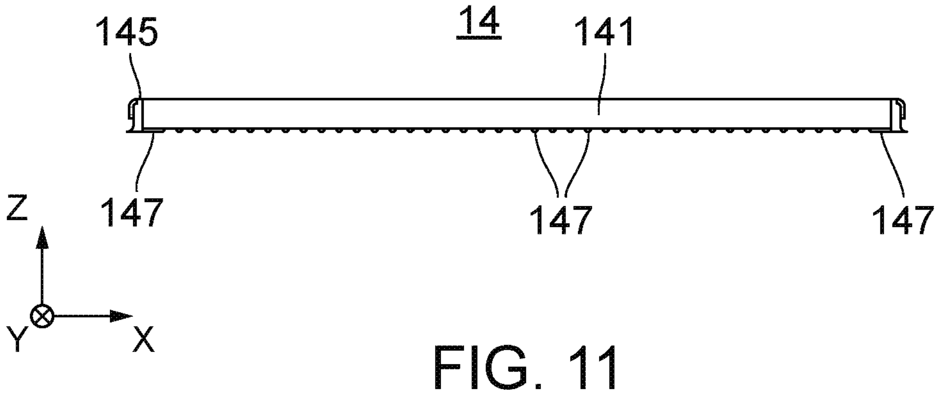
FIG. 11 is a front view showing the holding member of FIG. 9.
Figure 12:
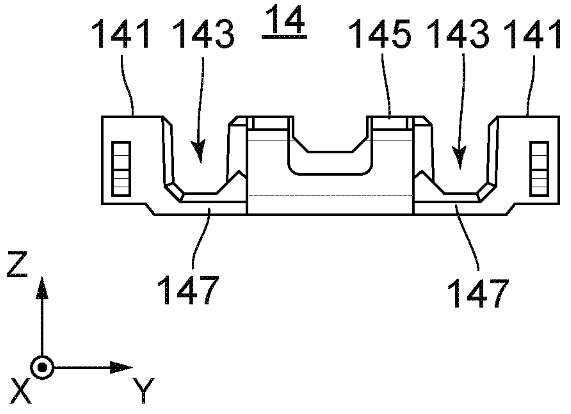
FIG. 12 is a side view showing the holding member of FIG. 9.
Figure 13:
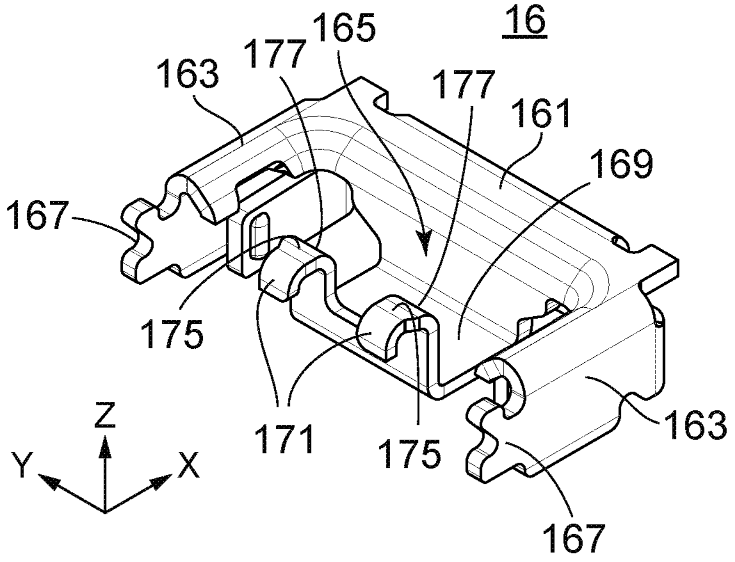
FIG. 13 is a top, perspective view showing one of holddowns included in the connector of FIG. 7.
Figure 14:
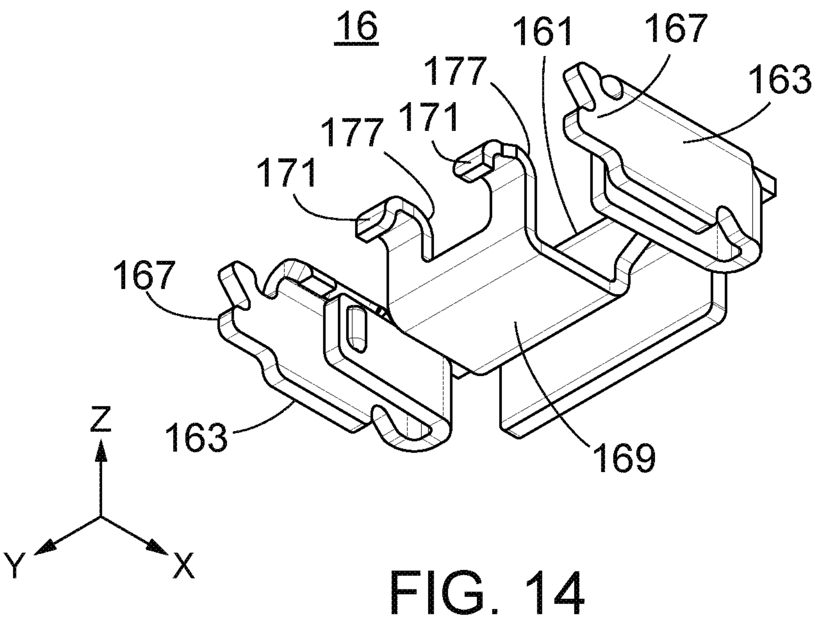
FIG. 14 is a bottom, perspective view showing the holddown of FIG. 13.
Figure 15:
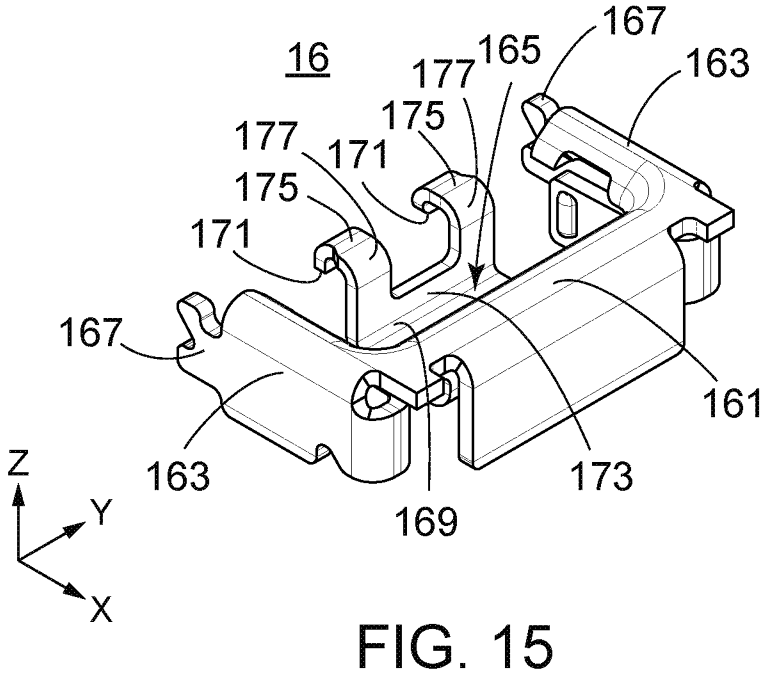
FIG. 15 is another top, perspective view showing the holddown of FIG. 13.
Figure 16:
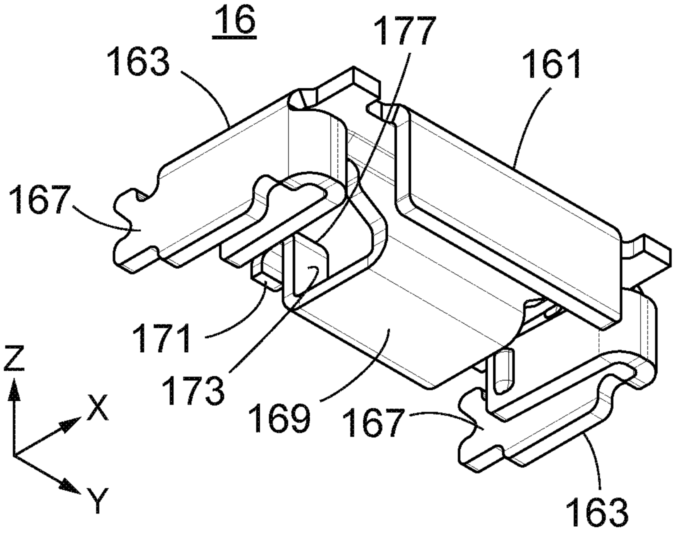
FIG. 16 is another bottom, perspective view showing the holddown of FIG. 13.

As understood from FIGS. 9 and 10, in the holding member 14 of the connector 10 according to the present embodiment, a cross-sectional area taken on a plane perpendicular to the pitch direction is the smallest at the end portion of the holding member 14 in the pitch direction. This means that this structure does not have a portion which might become a bottleneck when the holding member 14 is molded. Thus, the holding member 14 is improved so that fluidity of melted resin upon molding thereof is increased. Accordingly, it is easy to increase a size of the holding member 14 in the pitch direction and the number of the terminals 12. Therefore, in the connector 10 of the present embodiment, it is easy to increase the number of the terminals 12.

Figure 17:
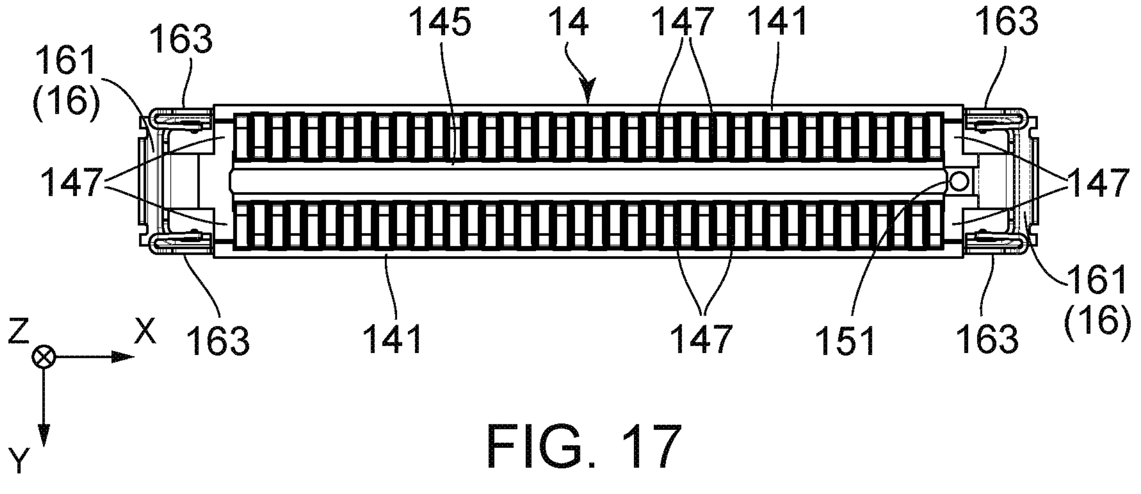
FIG. 17 is a bottom view showing a modified example of the connector according to the embodiment of the invention. Terminals thereof are omitted in the figure.
Figure 18:
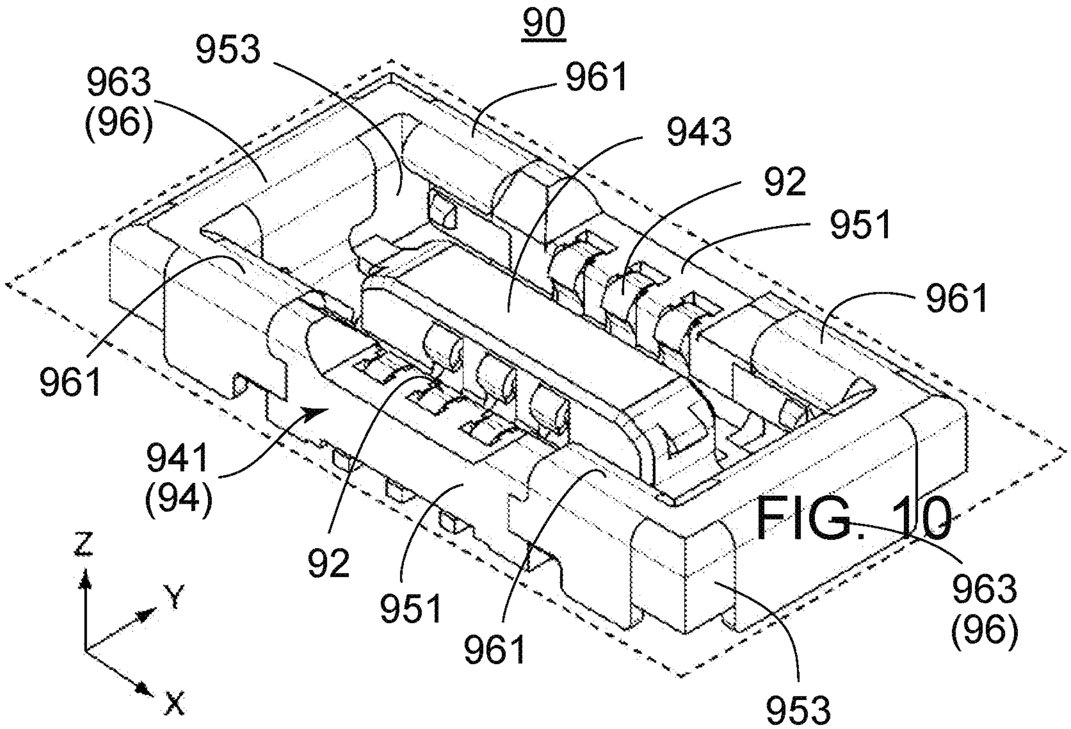
FIG. 18 PRIOR ART
FIG. 18 is a perspective view showing a connector disclosed in Patent Document 1.

As understood from FIGS. 9 and 10, the end portion of the holding member 14 in the pitch direction is the end portion of the island portion 145 in the pitch direction. Accordingly, the molding of the holding member 14 is performed so that melted resin flows through a part of a cavity of a die, which corresponds to one of the end portions of the island portion 145 in the pitch direction, to another part of the cavity, which corresponds to the other of the end portions of the island portion 145 in the pitch direction. Consequently, as shown in FIG. 17, on the holding member 14 of the connector 10 according to the present embodiment, a gate mark 151 is provided near one of the end portions of the island portion 145 in the pitch direction, specifically, at a bottom portion of the island portion 145. It is noted that the gate mark 151 is a mark of an inlet gate for the cavity of the die (not shown) used for molding the holding member 14. The bottom portion of the island portion 145 is a part directed downward in the up-down direction. Incidentally, short shot of the molded resin to be filled into the cavity can be easily solved by increasing the number of inlet gates. However, increasing the number of the inlet gates tends to generate weld lines on a molded article or the holding member 14. The weld lines deteriorate strength of the molded article. Accordingly, it is preferable that the number of the inlet gate(s) is equal to one, and, in that sense, the structure of the holding member 14 of the present embodiment is valid.

Although the specific explanation about the present invention is made above with reference to the embodiments, the present invention is not limited thereto but susceptible of various modifications and alternative forms without departing from the spirit of the invention.

In the aforementioned embodiment, the size of the side portion 141 of the holding member 14 in the pitch direction is smaller than that of the island portion 145 in the pitch direction. However, the size of the side portion 141 of the holding member 14 in the pitch direction may be larger than that of the island portion 145 in the pitch direction.

Moreover, in the aforementioned embodiment, the terminals 12 of each of the terminal rows 20 are arranged so that the contact points 131 of the first terminals 121 and the contact points 131 of the second terminals 123 form a staggered arrangement. However, the terminals 12 of each of the terminal rows 20 may be arranged so that the contact points 131 of them are arranged in a straight line. In that case, the first terminal 121 and the second terminal 123 may have shapes same as each other.

Further, in the aforementioned embodiment, the island portion 145 has the generally frame shape. However, the island portion 145 may have a generally rectangular parallelepiped shape like the protruding wall 943 of Patent Document 1.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector comprising a plurality of terminals, a holding member which holds the terminals and two holddowns which are located at both ends of the holding member in a pitch direction, wherein:

the holding member comprises two side portions, two accommodation portions and an island portion;

the island portion is located between the side portions in a width direction perpendicular to the pitch direction;

the accommodation portions correspond to the side portions, respectively;

each of the accommodation portions is located between the side portion corresponding thereto and the island portion in the width direction;

each of the accommodation portions is an area which accommodates a part of the mating connector when the connector and the mating connector are mated with each other;

the accommodation portions have a size that is not larger than the island portion in the pitch direction;

each of the terminals has a contact point;

the terminals are divided into two terminal rows;

the terminal rows correspond to the accommodation portions, respectively;

the contact points of the terminals belonging to each of the terminal rows are located at least in part in the accommodation portion corresponding to the terminal row;

each of the holddowns has an end wall portion and two side coupling portions;

the end wall portion is located at either one of end portions of the connector in the pitch direction;

the side coupling portions couple the end wall portion to the side portions, respectively;

the holding member does not overlap with the end wall portions of the holddowns in an up-down direction perpendicular to both the pitch direction and the width direction;

the end wall portion is apart from the holding member in the pitch direction; and the island portion is provided with a gate mark on a bottom portion thereof at a vicinity of one of the end portions thereof in the pitch direction.

2. A connector comprising a plurality of terminals, a holding member which holds the terminals and two holddowns which are located at both ends of the holding member in a pitch direction, wherein:

the holding member comprises two side portions, two accommodation portions and an island portion;

the island portion is located between the side portions in a width direction perpendicular to the pitch direction;

the accommodation portions correspond to the side portions, respectively;

each of the accommodation portions is located between the side portion corresponding thereto and the island portion in the width direction;

each of the accommodation portions is an area which accommodates a part of the mating connector when the connector and a mating connector are mated with each other;

each of the terminals has a contact point;

the terminals are divided into two terminal rows;

the terminal rows correspond to the accommodation portions, respectively;

the contact points of the terminals belonging to each of the terminal rows are located at least in part in the accommodation portion corresponding to the terminal row; and the island portion is provided with a gate mark on a bottom portion thereof at a vicinity of one of the end portions thereof in the pitch direction.

* * * * *